US011332125B2

(12) United States Patent
Sakai et al.

(10) Patent No.: US 11,332,125 B2
(45) Date of Patent: May 17, 2022

(54) PARKING ASSIST DEVICE, VEHICLE, AND PARKING ASSIST METHOD

(71) Applicant: Panasonic Intellectual Property Management Co., Ltd., Osaka (JP)

(72) Inventors: Yukio Sakai, Osaka Fu (JP); Shota Akaura, Kanagawa Ken (JP); Yuya Matsumoto, Tokyo To (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/950,487

(22) Filed: Nov. 17, 2020

(65) Prior Publication Data

US 2021/0162986 A1 Jun. 3, 2021

(30) Foreign Application Priority Data

Nov. 28, 2019 (JP) .............................. JP2019-215781

(51) Int. Cl.
*B60W 30/06* (2006.01)
*B60L 53/36* (2019.01)
*B60L 53/126* (2019.01)
*B60K 35/00* (2006.01)

(52) U.S. Cl.
CPC .............. *B60W 30/06* (2013.01); *B60K 35/00* (2013.01); *B60L 53/126* (2019.02); *B60L 53/36* (2019.02); *B60K 2370/152* (2019.05); *B60K 2370/166* (2019.05); *B60K 2370/175* (2019.05)

(58) Field of Classification Search
CPC ....... B60W 30/06; B60L 53/126; B60L 53/36; B60K 35/00; B60K 2370/175; B60K 2370/152; B60K 2370/166
See application file for complete search history.

(56) References Cited

U.S. PATENT DOCUMENTS

| | | | |
|---|---|---|---|
| 2013/0062966 A1* | 3/2013 | Verghese | B60L 53/126 307/104 |
| 2015/0094887 A1* | 4/2015 | Kawashima | H02J 50/80 701/22 |
| 2015/0263536 A1* | 9/2015 | Niizuma | B60L 53/126 307/104 |
| 2015/0336464 A1* | 11/2015 | Bell | H02J 7/0027 320/108 |

(Continued)

FOREIGN PATENT DOCUMENTS

| | | | |
|---|---|---|---|
| DE | 102011006504 A1 * | 10/2012 | ......... B60L 11/1833 |
| JP | 2016-141161 | 8/2016 | |

(Continued)

*Primary Examiner* — Chico A Foxx
(74) *Attorney, Agent, or Firm* — Greenblum & Bernstein, P.L.C.

(57) ABSTRACT

A parking assist device includes a hardware processor to: acquire region information on a parking region in which a contactless power feeding device is provided; perform, based on the region information, a first vehicle control for moving a vehicle to the parking region; and perform, after the vehicle is stopped in the parking region by the first vehicle control, a second vehicle control when relative positions between a power reception device provided in the vehicle and the contactless power feeding device deviate from each other.

16 Claims, 8 Drawing Sheets

(56) References Cited

U.S. PATENT DOCUMENTS

| | | | |
|---|---|---|---|
| 2016/0025821 A1* | 1/2016 | Widmer | G01R 33/0047 |
| | | | 324/258 |
| 2016/0033288 A1* | 2/2016 | Ueda | B60L 53/55 |
| | | | 701/302 |
| 2016/0332575 A1* | 11/2016 | Fukushima | H01F 38/14 |
| 2017/0274789 A1* | 9/2017 | Ma | B60L 53/37 |
| 2020/0307403 A1* | 10/2020 | Rastoll | G05D 1/0246 |
| 2021/0008999 A1* | 1/2021 | Rodriguez Romero | |
| | | | B60L 53/36 |

FOREIGN PATENT DOCUMENTS

| | | | | |
|---|---|---|---|---|
| WO | WO-2015114782 A1 * | 8/2015 | | B60L 11/1803 |
| WO | WO-2018023063 A1 * | 2/2018 | | B60L 11/1833 |

* cited by examiner

PARKING ASSIST DEVICE, VEHICLE, AND PARKING ASSIST METHOD

CROSS-REFERENCE TO RELATED APPLICATIONS

This application is based upon and claims the benefit of priority from Japanese Patent Application No. 2019-215781, filed Nov. 28, 2019, the entire contents of which are incorporated herein by reference.

FIELD

The present disclosure relates to a parking assist device, a vehicle, and a parking assist method.

BACKGROUND

Conventionally, technologies for automatically parking a vehicle in a parking region provided with a contactless power feeding device have been known (for example, Japanese Patent Application Laid-open No. 2016-141161). In a parking assist device disclosed in Japanese Patent Application Laid-open No. 2016-141161, the parking assist device determines a parking position at which power feeding efficiency of contactless charging becomes maximum, and automatically parks a vehicle at the determined parking position.

However, due to specific circumstances of contactless charging, further improvement to alignment is necessary when automatically parking a vehicle in a parking region in which a contactless power feeding device is provided.

Therefore, it is desired to improve the parking assist for automatically parking a vehicle to a parking region provided with a contactless power feeding device.

SUMMARY

A parking assist device according to the present disclosure includes a hardware processor configured to: acquire region information on a parking region in which a contactless power feeding device is provided; perform, based on the region information, a first vehicle control for moving a vehicle to the parking region; and perform, after the vehicle is stopped in the parking region by the first vehicle control, a second vehicle control when relative positions between a power reception device provided in the vehicle and the contactless power feeding device deviate from each other.

A vehicle according to the present disclosure includes: an acquisition device configured to acquire region information on a parking region in which a contactless power feeding device is provided; a power reception device configured to receive power from the contactless power feeding device; and a parking assist device including a hardware processor configured to perform, based on the region information, a first vehicle control for moving the vehicle to the parking region, and perform, after the vehicle is stopped in the parking region by the first vehicle control, a second vehicle control when relative positions between the power reception device and the contactless power feeding device deviate from each other.

A parking assist method according to the present disclosure is implemented by a computer provided in a vehicle. The method includes: acquiring region information on a parking region in which a contactless power feeding device is provided; performing, based on the region information, a first vehicle control for moving the vehicle to the parking region; and performing, after the vehicle is stopped in the parking region by the first vehicle control, a second vehicle control when relative positions between a power reception device included in the vehicle and the contactless power feeding device deviate from each other.

DETAILED DESCRIPTION

Due to the development of technology that a parking assist device automatically parks by controlling a vehicle (hereinafter referred to as "automatic parking"), it is assumed that a vehicle capable of contactless charging is automatically parked in a parking region where contactless power feeding device is provided. As a specific example, the parking assist device determines the current position of a vehicle by receiving signals from global navigation satellite system(s) (GNSS) satellites. The parking assist device determines, as a parking position where the vehicle is to be parked, a position at which charging efficiency of contactless power feeding becomes maximum. The parking assist device calculates a parking path based on: the current position of the vehicle at the time of starting parking assist; and the determined parking position, and automatically parks the vehicle to the determined parking position.

However, when the automatic parking is performed, the parking assist device may park the vehicle to a position different from the determined parking position. For example, in a multistory parking lot or an indoor parking lot, an error in determination of the current position of the vehicle may occur at the time of starting parking assist. Thus, the parking position after the automatic parking may be a position different from the determined parking position. In other words, the vehicle may be parked at a position different from the parking position at which charging efficiency of contactless charging becomes maximum Thus, the charging efficiency of contactless charging may reduce as compared with the case where the vehicle is parked at the parking position at which the charging efficiency becomes maximum.

In view of the above, in the following embodiments, after the parking assist device performs automatic parking and the vehicle is parked, the parking assist device performs control for moving the vehicle as necessary. As an example, when a parked position after automatic parking is inappropriate, the parking assist device moves the vehicle to a position at which charging efficiency of contactless charging becomes equal to or larger than a reference value. Thus, the vehicle is able to perform contactless charging with appropriate charging efficiency. The position at which the charging efficiency of contactless charging becomes equal to or larger than the reference value may be, for example, a position at which the charging efficiency of contactless charging becomes maximum.

Embodiments will be described in detail below with reference to the drawings.

First Embodiment

Figure 1:
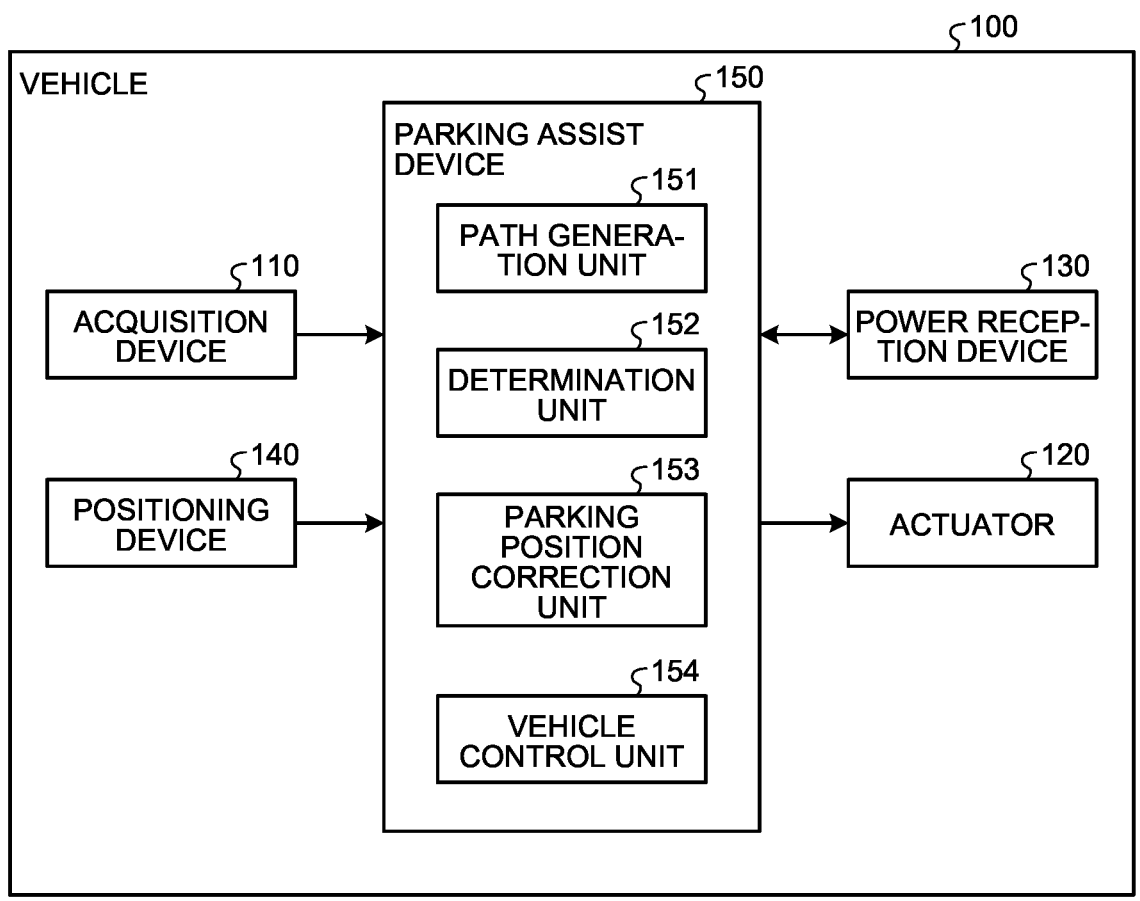
FIG. 1 is a block diagram illustrating a configuration of a vehicle including a parking assist device according to a first embodiment of the present disclosure.
Figure 2:
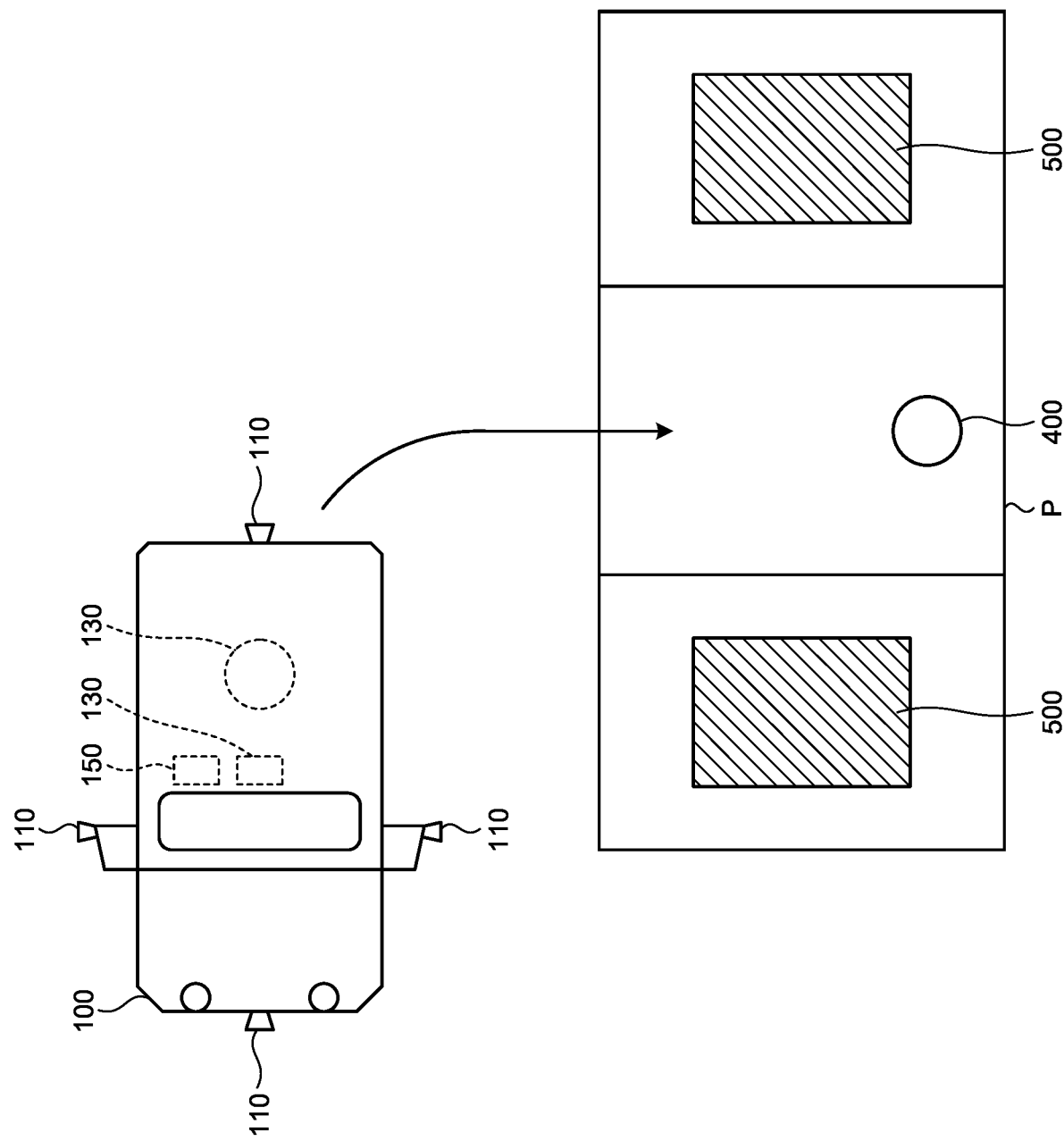
FIG. 2 is a diagram for explaining parking assist according to the first embodiment of the present disclosure.

FIG. 1 is a block diagram illustrating a configuration of a vehicle 100 including a parking assist device 150 according to a first embodiment. FIG. 2 is a diagram for explaining parking assist according to the first embodiment.

As illustrated in FIG. 1, the vehicle 100 according to the first embodiment includes an acquisition device 110, an actuator 120, a power reception device 130, a positioning device 140, and a parking assist device 150. As illustrated in FIG. 2, a contactless power feeding device 400 is provided in a parking region P in which the vehicle 100 can be parked.

The contactless power feeding device 400 includes a feeding coil, and is able to transmit power to the power reception device 130 in a contactless manner. The contactless power feeding device 400 controls the transmission of power from the feeding coil. The contactless power feeding device 400 may include a communication unit, and transmit, to the vehicle 100, position information representing the position of the contactless power feeding device 400. Examples of the position information representing the position of the contactless power feeding device 400 include position coordinates of the center of a feeding coil. Although the details are described later, when the communication unit receives from the vehicle 100 a start signal for starting contactless charging, the contactless power feeding device 400 transmits power to the feeding coil to start contactless charging for the power reception device 130.

Configuration of the Vehicle 100

The vehicle 100 is an electric vehicle (EV) or a plugin hybrid vehicle (PHV) that charges a battery with power supplied from the outside.

In the vehicle 100, the power reception device 130 is provided at a lower part of a vehicle body. The power reception device 130 includes a receiving coil. The receiving coil is configured such that power is transferred from the feeding coil based on the principle of electromagnetic induction. The receiving coil is configured such that a battery mounted on the vehicle 100 is charged when supplied with power. When the power reception device 130 is disposed at a position facing the contactless power feeding device 400, contactless charging can be efficiently performed. In other words, when the relative positions between the power reception device 130 and the contactless power feeding device 400 do not deviate from each other, contactless charging can be efficiently performed. In the following, the position at which the power reception device 130 faces the contactless power feeding device 400 is referred to as a "first position". As an example, the first position is a position at which the charging efficiency of contactless charging becomes maximum. The first position is a position at which the center position of the receiving coil and the center position of the feeding coil match in the vertical direction. The first position may be a position at which the charging efficiency of contactless charging becomes equal to or higher than a reference value.

The power reception device 130 includes a communication unit. When the parking of the vehicle 100 has completed, the power reception device 130 transmits, to the contactless power feeding device 400, a start signal for starting contactless charging.

When the parking region P and the contactless power feeding device 400 are near the vehicle 100, the acquisition device 110 acquires position information on the parking region P and the contactless power feeding device 400.

As an example, the acquisition device 110 is an imaging device provided ahead of the vehicle body, behind the vehicle body, or on the side of the vehicle body of the vehicle 100. The imaging device is able to take an image of the parking region P. The imaging device processes the taken image signal to detect the parking region P. The imaging device outputs, to the parking assist device 150, information representing the detected parking region. The information representing the parking region may include information representing that a space allowing parking is present in the detected parking region P and information representing position coordinates of the parking region P. In addition, the imaging device takes an image of the contactless power feeding device 400, and detects the contactless power feeding device 400 from the taken image signal. The imaging device outputs, to the parking assist device 150, information representing the detected contactless power feeding device 400. The information representing the contactless power feeding device 400 may include information representing the presence of the contactless power feeding device 400 and information representing position coordinates of the contactless power feeding device 400. In the following, information including at least one of information representing a parking region and information representing the contactless power feeding device 400 is referred to as "region information".

The imaging device may be, for example, a visible camera, a CCD camera, or a CMOS camera. Images taken by the imaging device may be still images or moving images. Moreover, images taken by a camera may be received by the parking assist device 150 described later, and the parking assist device 150 may process the image signal to detect the parking region P.

As another example of the acquisition device 110, the acquisition device 110 is a ranging sensor, such as ultrasonic sonar, provided ahead of the vehicle body, behind the vehicle body, or on the side of the vehicle body of the vehicle 100. For example, the ultrasonic sonar radiates ultrasonic waves when the vehicle 100 is traveling in a parking lot, and detects a distance to a parked vehicle 500 present around the vehicle 100 based on detected reflective waves reflected by the parked vehicle 500 in the parking lot. The ultrasonic sonar calculates contour points of the parked vehicle 500 based on the distance to the parked vehicle 500, and acquires information representing a parking region based on the contour points. The ultrasonic sonar outputs, to the parking assist device 150, the acquired information representing the parking region. The ultrasonic sonar acquires, from the reflective waves, information representing the contactless power feeding device 400. The ultrasonic sonar outputs, to the parking assist device 150, the information representing the contactless power feeding device 400.

The ranging sensor is not limited to an ultrasonic sensor, and may be, for example, millimeter-wave radar or LiDAR (Light Detection and Ranging; Laser Imaging Detection and Ranging). Moreover, the parking assist device 150 may acquire information measured by a ranging sensor, and the parking assist device 150 may calculate contour points to acquire region information.

As another example of the acquisition device 110, the acquisition device 110 is a reception device. The reception device communicates with a management server for managing a parking lot, and receives information representing a parking region. The reception device (110) may receive, as information representing a parking region, a parking path used for parking the vehicle 100 in a parking region P. The reception device (110) outputs, to the parking assist device 150, information representing a parking region.

The reception device (110) communicates with the contactless power feeding device 400, and receives information representing the contactless power feeding device 400. The reception device outputs, to the parking assist device 150, the received information representing the contactless power feeding device 400. The reception device and the management server may communicate over a network such as the Internet or by using wireless communication.

The positioning device 140 acquires current position information on the vehicle 100. The positioning device 140 outputs, to the parking assist device 150, the acquired current position information on the vehicle 100. As an example, the positioning device 140 may receive signals from positioning satellites used for GNSS, and measure the current position of the vehicle 100 based on the received signal.

The actuator 120 includes an engine actuator, a brake actuator, and a steering actuator. The parking assist device 150 controls the engine actuator, the brake actuator, and the steering actuator, based on the generated parking path. The engine actuator adjusts the supply amounts of fuel and air to an engine, based on the output of the parking assist device 150. The brake actuator adjusts braking force of a wheel based on output of the parking assist device 150. The steering actuator adjusts a steering angle of the vehicle 100 based on output of the parking assist device 150.

Configuration of the Parking Assist Device 150

The parking assist device 150 includes a path generation unit 151, a determination unit 152, a parking position correction unit 153, and a vehicle control unit 154.

The path generation unit 151 generates a parking path for moving the vehicle 100 from the current position of the vehicle 100 to a parking region P. Specifically, the path generation unit 151 generates a parking path used for moving the vehicle 100 from the current position of the vehicle 100 to the first position. As an example, the current position of the vehicle 100 is the position of the vehicle 100, at which the parking assist device 150 starts parking assist. The path generation unit 151 acquires current position information on the vehicle 100 from the positioning device 140. The path generation unit 151 acquires region information from the acquisition device 110. Specifically, the path generation unit 151 acquires information representing the contactless power feeding device 400 from the acquisition device 110. The path generation unit 151 generates a parking path based on coordinates of the current position of the vehicle 100 and position coordinates of the contactless power feeding device 400. The parking path is generated with a combination of combining straight lines, clothoid curves, and arcs. The clothoid curve is a curve obtained by changing the radius of curvature at a given rate.

The determination unit 152 determines whether to perform a second vehicle control that will be described later. As an example, the determination unit 152 determines a distance between the first position and a position (hereinafter referred to as a "second position") at which the vehicle 100 is stopped in the parking region P after a first vehicle control described later. The second position is specified based on the center position of the power reception device 130. The second position may be specified based on the center position of the power reception device 130, which corresponds to the center position of the contactless power feeding device 400.

When the determined distance mentioned above is larger than a predetermined value, the determination unit 152 determines to perform the second vehicle control, and outputs, to the vehicle control unit 154, information representing that the second vehicle control is to be performed. In other words, the determination unit 152 determines a deviation amount of the relative positions between the contactless power feeding device 400 and the power reception device 130, based on the distance between the first position and the second position. The determination unit 152 determines to perform the second vehicle control when the determined deviation amount of the relative positions is relatively large.

On the other hand, when the determined distance is equal to or smaller than the predetermined value, the determination unit 152 outputs information representing that the second vehicle control is not to be performed to the vehicle control unit 154. Note that the predetermined value may be a value that can be set as appropriate. For example, the predetermined value is set such that a distance between the first position and the second position in a vehicle length direction of the vehicle 100 is 75 mm. Alternatively, the predetermined value may be set such that a distance between the first position and the second position in a vehicle width direction of the vehicle 100 is 100 mm.

Note that an existing method may be used as a method for determining the distance between the first position and the second position by the determination unit 152. For example, the relative positions between the center position of the contactless power feeding device 400 and the center position of the power reception device 130 are determined when a position sensor included in the contactless power feeding device 400 and a position sensor included in the power reception device 130 exchange position information in the X direction and the Y direction through communications. In this case, the pieces of position information are exchanged by a plurality of position sensors with different frequencies. The X direction is a direction along the width of a parking region in a transverse direction, and the Y direction is a direction along the width of the parking region in a longitudinal direction.

Alternatively, the determination unit 152 may determine, based on an LPE voltage, the direction from the second position to the first position and the distance between them. The LPE voltage is a voltage generated across a resistor during power reception of contactless charging. The value of the LPE voltage becomes larger as the relative distance between the feeding coil and the receiving coil becomes smaller, and takes the maximum value when there is no positional deviation between the center position of the feeding coil and the center position of the receiving coil. Thus, the parking assist device 150 may store therein the correlation between the value of the LPE voltage and the relative distance between the receiving coil and the feeding coil, and compare with the value of the LPE voltage at the second position to determine the distance and the direction to the first position.

The determination unit 152 may receive, from the power reception device 130, information on charging efficiency in a case of starting contactless charging at the second position, and determine whether to perform the second vehicle control based on the received information. When the charging efficiency is smaller than the reference value, the determination unit 152 outputs, to the vehicle control unit 154, information representing that second vehicle control is to be performed. In other words, the determination unit 152 determines, based on charging efficiency at the time of starting contactless charging at the second position, a deviation amount of the relative positions between the contactless power feeding device 400 and the power reception device 130. The determination unit 152 determines to perform the second vehicle control when the determined deviation amount of the relative positions is relatively large.

On the other hand, when the charging efficiency mentioned above is equal to or higher than the reference value, the determination unit 152 outputs, to the vehicle control unit 154, information representing that the second vehicle control is not to be performed. Note that the reference value only needs to be a value that can be set as appropriate. For example, the reference value may be set as a value with which the charging efficiency is 80% or more. More preferably, the reference value may be set as a value with which the charging efficiency is 85% or more. Note that an existing method only needs to be used as a method for calculating charging efficiency by the power reception device 130.

The parking position correction unit 153 generates a corrected path for moving the vehicle 100 from the second position of the vehicle 100 to the first position. The parking position correction unit 153 acquires, from the positioning device 140, current position information on the vehicle 100. The current position information on the vehicle 100 acquired by the parking position correction unit 153 corresponds to position information on the second position. The parking position correction unit 153 acquires, from the acquisition device 110, information representing the contactless power feeding device 400. The parking position correction unit 153 generates a corrected path based on coordinates of the current position of the vehicle 100 and position coordinates of the contactless power feeding device 400. The corrected path is generated by combining straight lines, clothoid curves, and arcs. The parking position correction unit 153 may acquire position coordinates of the contactless power feeding device 400 from the acquisition device 110, and generate a parking path based on position coordinates of the contactless power feeding device 400. Note that the parking position correction unit 153 may generate a corrected path based on the distance between the first position and the second position determined by the determination unit 152.

The vehicle control unit 154 moves the vehicle 100 through automatic parking by driving the actuator 120 based on the parking path for moving the vehicle 100 to the parking region P. The vehicle control unit 154 moves the vehicle 100 based on the parking path generated by the path generation unit 151 (hereinafter referred to as the "first vehicle control").

When the vehicle control unit 154 has acquired, from the determination unit 152, information representing that the second vehicle control is to be performed, the vehicle control unit 154 acquires, from the parking position correction unit 153, a corrected path used for moving the vehicle 100 from the second position to the first position. The vehicle control unit 154 moves the vehicle 100 based on the corrected path (hereinafter referred to as the "second vehicle control"). In other words, the vehicle control unit 154 performs the second vehicle control when the deviation amount of the relative positions between the contactless power feeding device 400 and the power reception device 130 is relatively large.

Note that automatic parking in the present disclosure includes the parking control for implementing semi-automatic parking assist for executing a partial automatic control, such as control that the steering of the vehicle 100 is automatically controlled by the parking assist device 150 including the vehicle control unit 154 and the driver operates an accelerator and a brake in accordance with instructions from the parking assist device 150.

When the vehicle control unit 154 acquires, from the determination unit 152, information representing that the second vehicle control is not performed (that is, the second vehicle control is suspended), the vehicle control unit 154 transmits, to the power reception device 130, information representing that the parking of the vehicle 100 has completed.

Processing Operation of the Parking Assist Device 150

Figure 3:
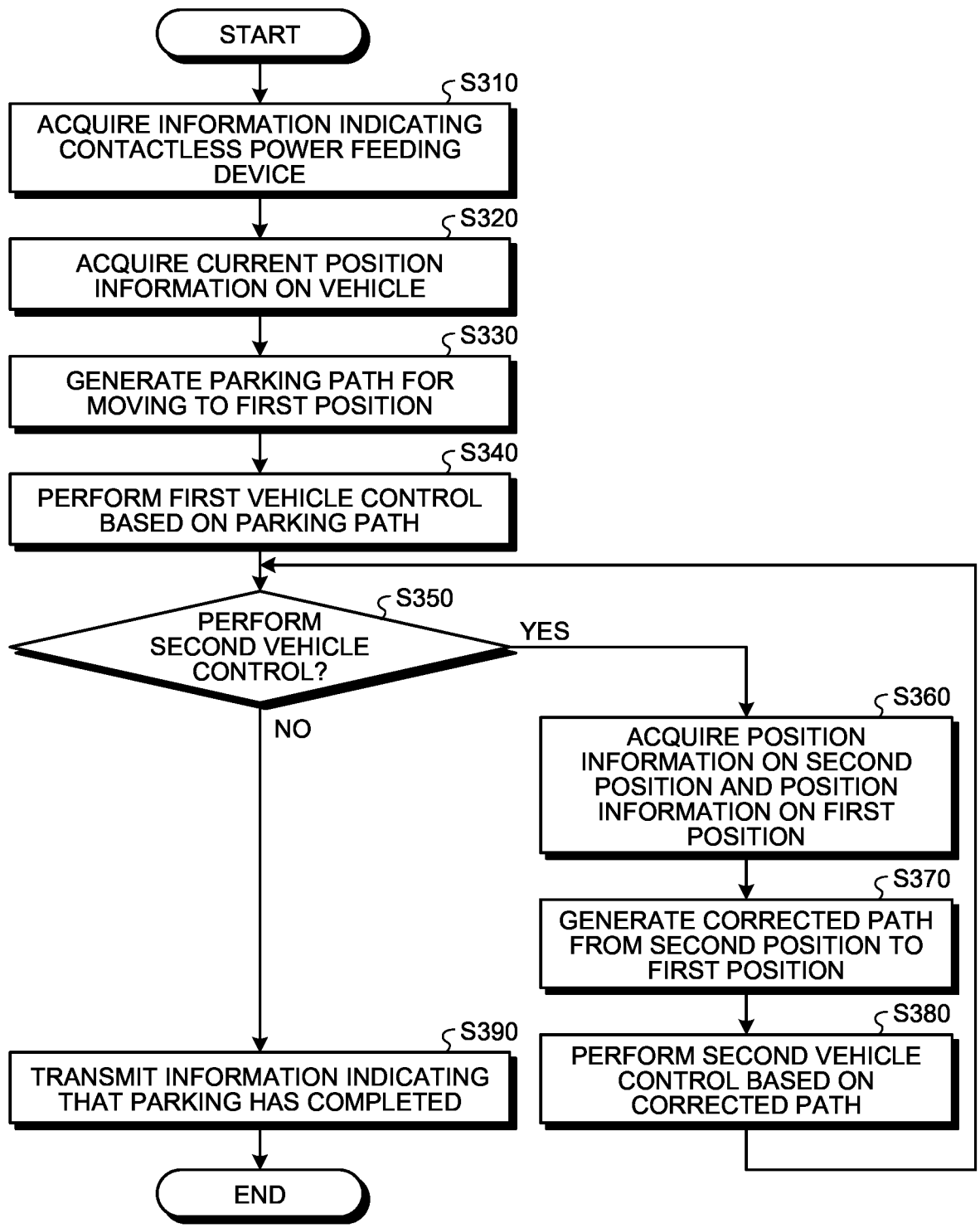
FIG. 3 is a flowchart illustrating processing operation of the parking assist device according to the first embodiment of the present disclosure.
Figure 4A:
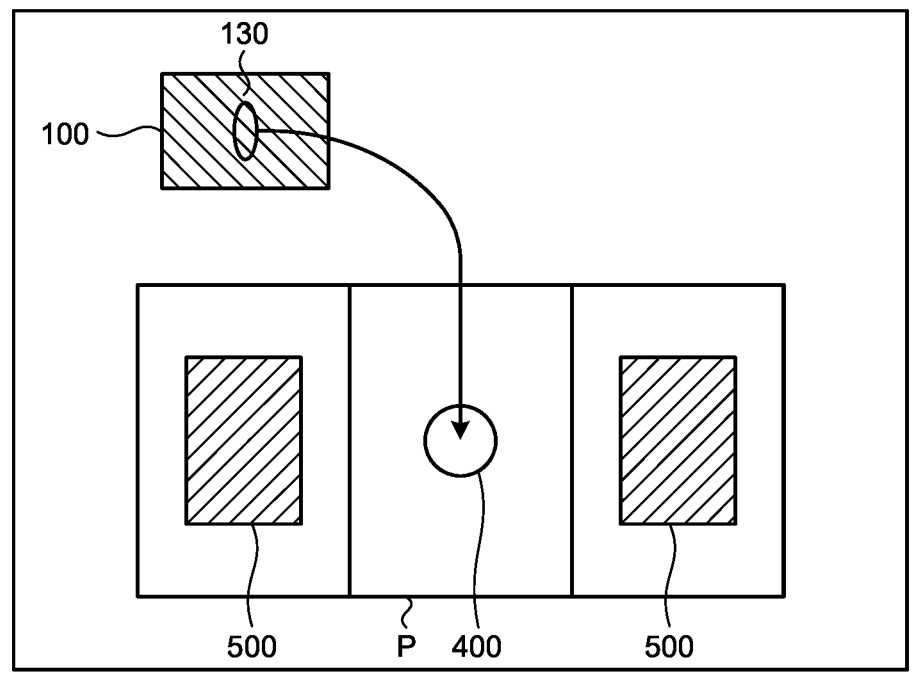
FIGS. 4A to 4C are each a diagram illustrating an application example of the parking assist device according to the first embodiment of the present disclosure.
Figure 4B:
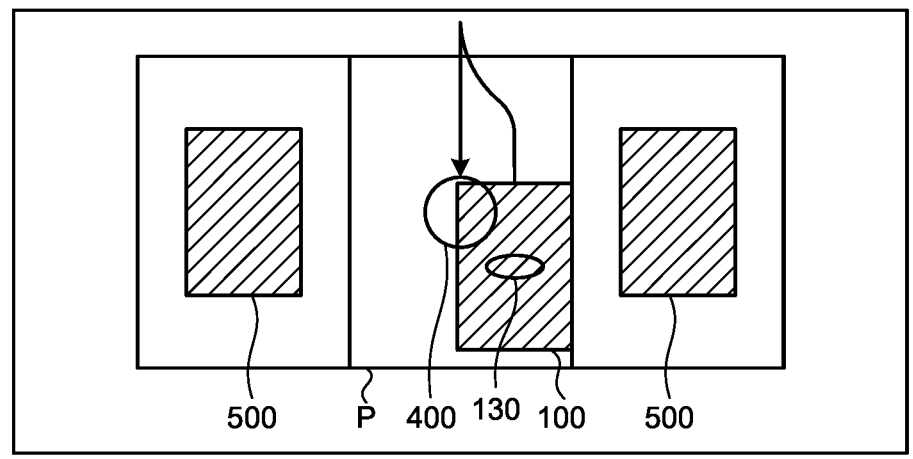
Figure 4C:
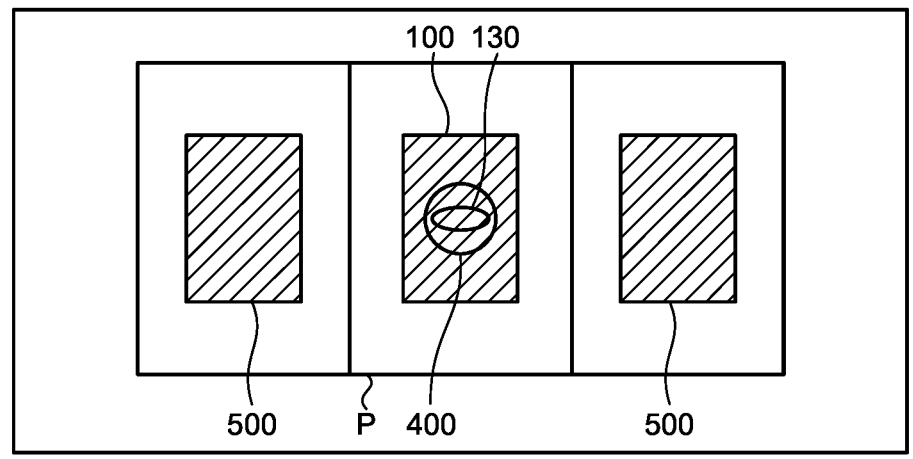

Processing operation of the parking assist device 150 will be described with reference to FIG. 3 and FIGS. 4A to 4C. FIG. 3 is a flowchart illustrating processing operation of the parking assist device 150 according to the first embodiment of the present disclosure. FIGS. 4A to 4C are each a diagram illustrating an application example of the parking assist device 150 according to the first embodiment of the present disclosure.

As illustrated in FIG. 4A, parked vehicles 500 have already been parked in two of three parking spaces, and a driver parks the vehicle 100 in a free parking space and performs contactless charging. In this case, an imaging device serving as the acquisition device 110 provided on the side of the vehicle body of the vehicle 100 stopped ahead of the parking space detects information representing the parking region. As an example, images of three parking spaces taken by the imaging device are subjected to image recognition processing so that a parking region P is detected from the three parking spaces. When information representing the parking region is input to the parking assist device 150, parking assist is started.

First, the path generation unit 151 acquires information representing the contactless power feeding device 400 (Step S310). For example, the imaging device takes an image of the contactless power feeding device 400, and detects, from a taken image signal, information representing the contactless power feeding device 400. The path generation unit 151 acquires, from the imaging device, the information representing the contactless power feeding device 400, and acquires position coordinates of the contactless power feeding device 400 included in the information representing the contactless power feeding device 400.

Subsequently, the path generation unit 151 acquires current position information on the vehicle 100 (Step S320). For example, the positioning device 140 receives signals from positioning satellites, and measures the current position of the vehicle 100 based on the received signals. The path generation unit 151 acquires from the positioning device 140 the current position information on the vehicle 100. In FIG. 4A, the vehicle 100 is stopped ahead of the parking space, and parking assist is started from the stop position. The path generation unit 151 acquires, as current position information on the vehicle 100, coordinates of the stop position at which the parking assist is started.

Next, the path generation unit 151 generates a parking path used for moving the vehicle 100 from the current position of the vehicle 100 to the first position (Step S330). As illustrated in FIG. 4A, the path generation unit 151 generates a parking path for moving the vehicle 100 by backward driving from the stop position to a position at which the power reception device 130 of the vehicle 100 faces the contactless power feeding device 400. The vehicle control unit 154 operates the actuator 120 to perform the first vehicle control based on the parking path (Step S340).

Next, the determination unit 152 determines whether to perform the second vehicle control (Step S350). FIG. 4B illustrates a stop position at which the vehicle 100 is stopped after the first vehicle control. The stop position at which the vehicle 100 is stopped after the first vehicle control corresponds to the second position. The determination unit 152 determines a distance between the stop position and the first position. For example, the determination unit 152 determines a distance between the center position of the power reception device 130 and the center position of the contactless power feeding device 400 in FIG. 4B, and determines a deviation amount of the relative positions.

When the distance between the stop position and the first position is larger than a predetermined value, the determination unit 152 determines to perform the second vehicle control ("Yes" at Step S350). In other words, when the deviation amount of the relative positions is larger than a predetermined value, the determination unit 152 determines to perform the second vehicle control. In FIG. 4B, the vehicle 100 is stopped at a position decentered in the parking region P through the first vehicle control. Thus, the relative positions between the power reception device 130 and the contactless power feeding device 400 deviate from each other.

When the determination unit 152 determines to perform the second vehicle control, the parking position correction unit 153 acquires position information on the second position and position information on the first position (Step S360). The parking position correction unit 153 acquires current position information as second position information on the vehicle 100 from the positioning device 140 and position information on the contactless power feeding device 400 as first position information from the acquisition device 110.

Next, the parking position correction unit 153 generates a corrected path for moving the vehicle 100 from the second position of the vehicle 100 to the first position (Step S370). As illustrated in FIG. 4B, the parking position correction unit 153 generates the corrected path on which the vehicle 100 moves forward from the stop position (the second position) and then moves backward to reach the first position. Based on the corrected path, the vehicle control unit 154 operates the actuator 120 to perform the second vehicle control (Step S380). After the vehicle 100 performs second vehicle control, the processing flow returns to the processing of Step S350.

When the determined distance between the stop position and the first position is equal to or smaller than the predetermined value, the determination unit 152 determines not to perform (that is, determines to suspend) the second vehicle control ("No" at Step S350). FIG. 4C illustrates a stop position at which the vehicle 100 is stopped after the second vehicle control. In this case, the vehicle 100 is stopped at a position where the power reception device 130 faces the contactless power feeding device 400 through the second vehicle control. Thus, no deviation arises in the relative positions between the power reception device 130 and the contactless power feeding device 400.

When the vehicle control unit 154 acquires, from the determination unit 152, information representing that second vehicle control is not performed (or is suspended), the vehicle control unit 154 transmits, to the power reception device 130, information representing that the parking of the vehicle 100 has completed (Step S390). When the power reception device 130 receives the information representing that the parking of the vehicle 100 has completed, the power reception device 130 transmits, to the contactless power feeding device 400, a start signal for starting contactless charging. When the contactless power feeding device 400 receives the start signal, the contactless power feeding device 400 transmits power to the feeding coil to start contactless charging.

Functions and Advantages

The parking assist device 150 exhibits the following functions and advantages.

The parking assist device 150 according to the first embodiment includes the path generation unit 151 and the vehicle control unit 154. The path generation unit 151 acquires region information on a parking region P in which the contactless power feeding device 400 is provided. The vehicle control unit 154 performs the first vehicle control for moving the vehicle 100 to the parking region P. After the vehicle 100 is stopped in the parking region P by performing the first vehicle control, the vehicle control unit 154 performs the second vehicle control when the relative positions between the power reception device 130 and the contactless power feeding device 400 deviate from each other.

In this manner, after the parking assist device 150 performs the first vehicle control, the parking assist device 150 performs the second vehicle control. Therefore, the deviation of the relative positions between the power reception device 130 and the contactless power feeding device 400 can be reduced, and the vehicle 100 can perform contactless charging with appropriate charging efficiency.

The first vehicle control is control for moving the vehicle 100 to a first position at which the power reception device 130 faces the contactless power feeding device 400. Therefore, the deviation of the relative positions between the power reception device 130 and the contactless power feeding device 400 can be suppressed.

The second vehicle control is control for moving the vehicle 100 to the first position from the second position at which the vehicle 100 has stopped in the parking region P. Therefore, the vehicle 100 can move to a position at which contactless charging can be performed with appropriate charging efficiency.

As an example, the first position is a position at which the charging efficiency of contactless charging becomes maximum. As a result, the vehicle 100 can perform contactless charging with the maximum charging efficiency.

The path generation unit 151 generates, based on information on the parking region P, a path for moving the vehicle 100 to the parking region P. Therefore, the vehicle control unit 154 can perform the first vehicle control to move the vehicle 100 to the parking region P.

The parking position correction unit 153 generates a path extending from the second position to the first position. Therefore, the vehicle control unit 154 can perform the second vehicle control to move the vehicle 100 to the first position as a target position. Thus, the vehicle 100 can perform contactless charging with appropriate charging efficiency.

The determination unit 152 determines a distance between the first position and the second position. When the determined distance is larger than a predetermined value, the vehicle control unit 154 performs the second vehicle control. Therefore, the second vehicle control can be performed when the distance between the position at which the vehicle 100 is stopped in the parking region P after the first vehicle control and the contactless power feeding device 400 is larger than a predetermined value.

The determination unit 152 receives, from the power reception device 130, information on charging efficiency in a case where contactless charging is started between the power reception device 130 and the contactless power feeding device 400. When the received information represents that the charging efficiency is smaller than the reference value, the vehicle control unit 154 performs the second vehicle control. Therefore, the second vehicle control can be performed when the charging efficiency at the time when the vehicle 100 is stopped in the parking region P after the first vehicle control is smaller than a reference value.

When the distance between the first position and the second position is equal to or smaller than the predetermined value, or when the charging efficiency at the time of start of contactless charging is equal to or larger than the reference value, the vehicle control unit 154 does not perform the second vehicle control (that is, the second vehicle control is suspended). Therefore, when efficient contactless power reception can be performed at the second position, the second vehicle control can be prevented from being performed. Thus, unnecessary operation can be omitted, and the convenience for the driver is improved.

When the distance between the first position and the second position is equal to or smaller than the predetermined value, or when the charging efficiency is equal to or higher than the reference value, the vehicle control unit 154 outputs a signal for starting contactless charging. By this, contactless charging can be automatically started when the parking has completed.

Second Embodiment

Next, a configuration of a parking assist device 230 according to a second embodiment will be described. The parking assist device 230 is different from the parking assist device 150 of the first embodiment in that, the parking assist device 230 includes an output unit 221, and the output unit 221 displays a corrected path extending from a second position to a first position on a display device 210 included in a vehicle 200. The parking assist device 230 is different from the parking assist device 150 of the first embodiment in that, the output unit 221 displays, on the display device 210, an image for allowing a driver to select whether to perform the second vehicle control. In the following, differences from the first embodiment are described, whereas descriptions of the same points as in the first embodiment are omitted.

Configuration of the Vehicle 200

Figure 5:
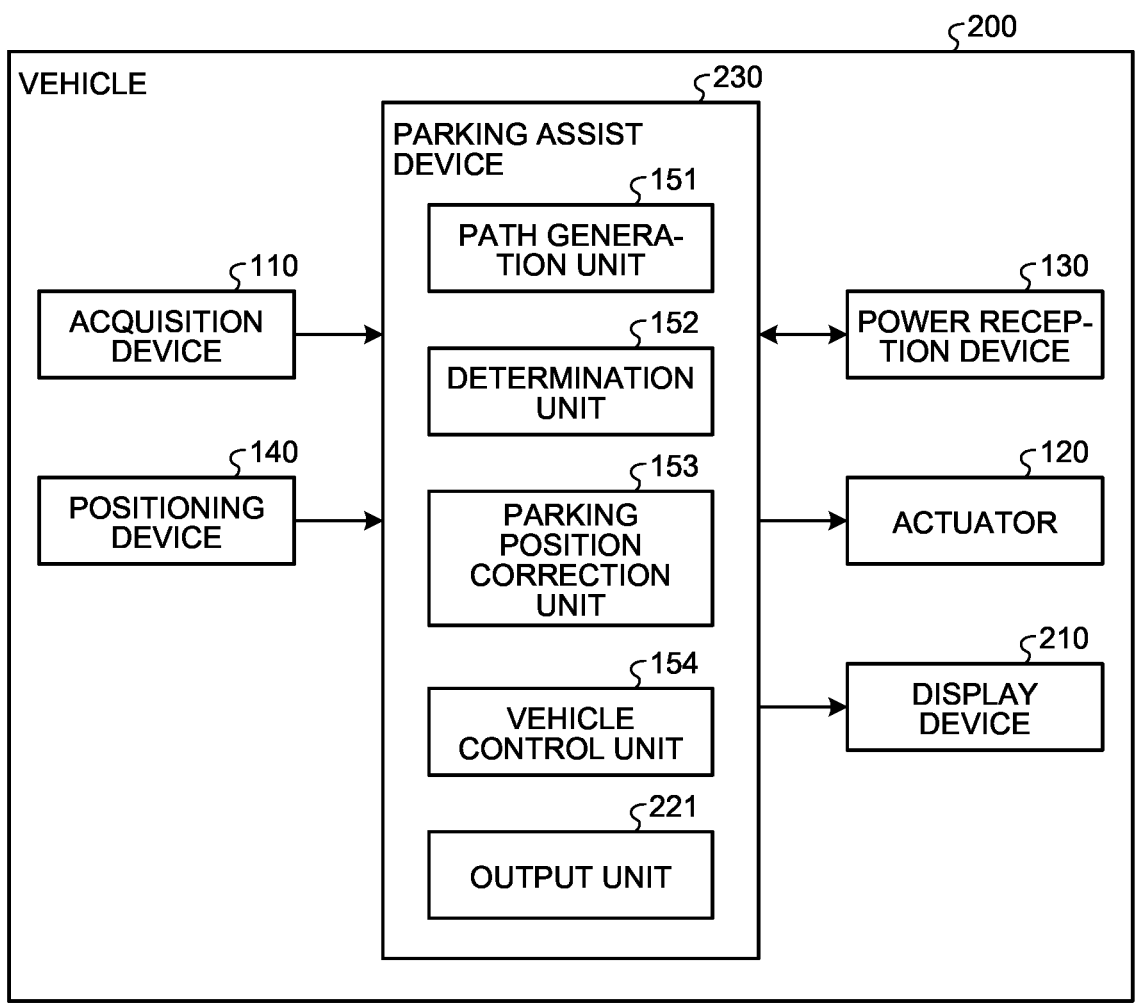
FIG. 5 is a block diagram illustrating a configuration of a vehicle including a parking assist device according to a second embodiment of the present disclosure.

FIG. 5 is a block diagram illustrating a configuration of the vehicle 200 including the parking assist device 230 according to the second embodiment. As illustrated in FIG. 5, the vehicle 200 according to the second embodiment further includes the display device 210.

The display device 210 is, for example, an electric display, and is installed in the interior of the vehicle 200. More preferably, the display device 210 is disposed at a position that can be visually recognized by a driver. The display device 210 displays or projects a corrected path extending from a second position to a first position, based on output from the output unit 221. Based on output from the output unit 221, the display device 210 displays a selection image 600 for allowing the driver to select whether to perform the second vehicle control. The image for allowing the driver to select whether to perform the second vehicle control may be implemented by displaying or projecting an icon including character information or figure information.

The display device 210 also serves as operation means, and may be configured to operate the second vehicle control when the driver touches characters indicating the selection image 600. An example will be described. The display device 210 may include, for example, a contact sensor or a proximity sensor. Examples of the contact sensor include an electrostatic contact sensor for detecting contact of an operator based on a change amount of electrostatic capacitance of electrodes. When an object (for example, a finger of driver) touches a character displayed on a screen of the display device 210, the contact sensor outputs, to the parking assist device 230, a signal representing that the touch on the character has been detected.

Configuration of the Parking Assist Device 230

As illustrated in FIG. 5, the parking assist device 230 according to the second embodiment further includes an output unit 221.

The output unit 221 acquires, from the parking position correction unit 153, information representing a corrected path. The output unit 221 generates an image representing the corrected path based on the information representing the corrected path. In the image representing the corrected path, the corrected path may be depicted by a line shape indicating the outer edge portion of a locus on which the vehicle 200 is to be moved. The shape of the outer edge portion of the corrected path is not limited to a straight line, and may be indicated by a curved line shape. When the outer edge portion of the corrected path is indicated by a line shape, a region surrounded by the outer edge portion may be displayed in a color different from that of the outer edge portion. By displaying the region in a color different from that of the outer edge portion, the corrected path can be displayed in an emphasized manner. In the case where the vehicle 200 is needed to turn when the vehicle 200 moves from the second position to the first position, the corrected path may be indicated by displaying a turning location of the vehicle 200. By this, the image displayed on the display device 210 is simplified to make it easier for the driver to view the image. The output unit 221 outputs the generated image representing the corrected path to the display device 210.

Figure 7:
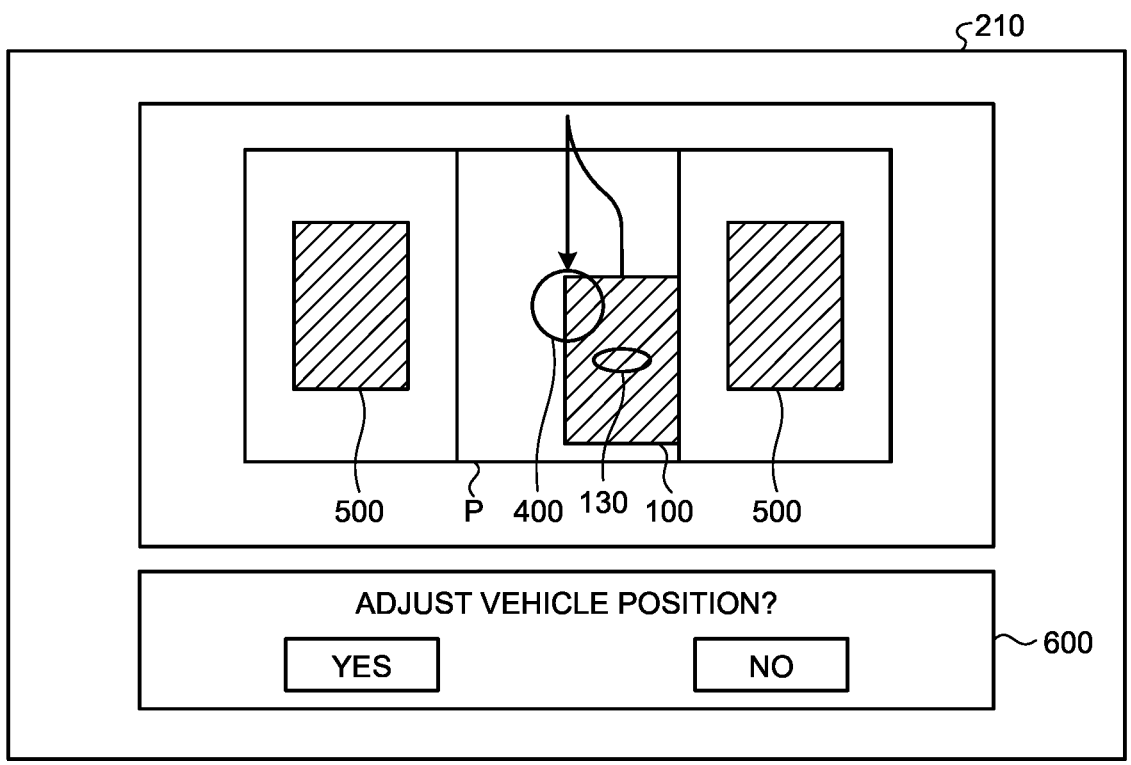
FIG. 7 is a diagram illustrating a display example of a display device according to the second embodiment of the present disclosure.

As illustrated in FIG. 7, the output unit 221 outputs, to the display device 210, a selection image 600 for allowing a driver to select whether to perform the second vehicle control. In the selection image 600, an icon including character information "Correct vehicle position?", "Yes", and "No", or figure information may be displayed. The output unit 221 may output such a selection image to the display device 210 when the determination unit 152 determines that second vehicle control is necessary.

Processing Operation of the Parking Assist Device 230

Figure 6:
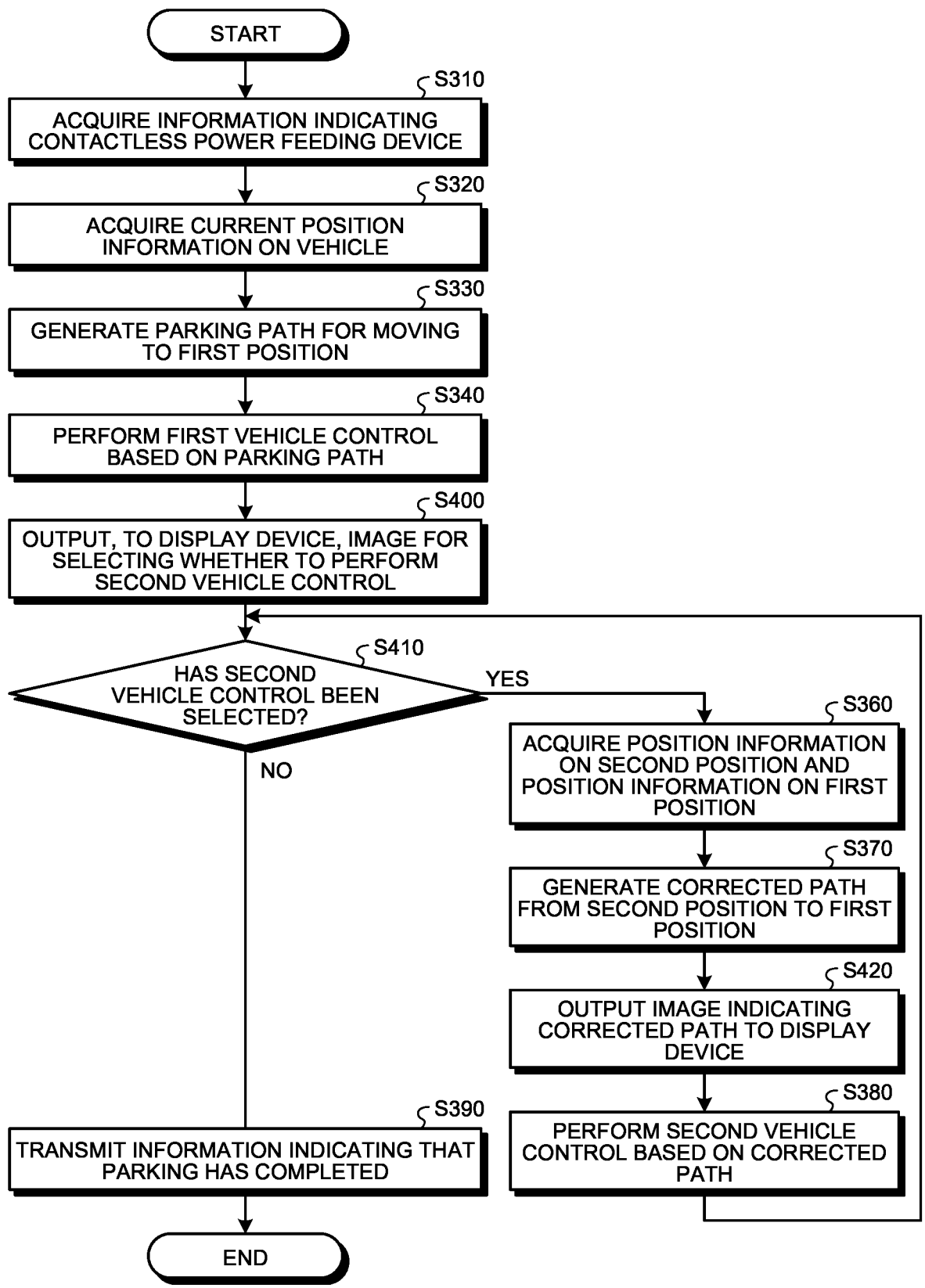
FIG. 6 is a flowchart illustrating processing operation of the parking assist device according to the second embodiment of the present disclosure.

Processing operation of the parking assist device 230 is described below. FIG. 6 is a flowchart illustrating processing operation of the parking assist device 230 according to the second embodiment. FIG. 7 is a diagram illustrating a display example of the display device 210 according to the second embodiment.

Processing from Step S310 to Step S340 is the same as the processing in FIG. 3 of the parking assist device 150 according to the first embodiment, and hence descriptions thereof are omitted below.

The output unit 221 outputs, to the display device 210, the selection image 600 for allowing the driver to select whether to perform the second vehicle control (Step S400). The display device 210 displays or projects the selection image 600 based on output from the output unit 221. As illustrated in FIG. 7, the selection image 600 may include character information such as "Correct vehicle position?", "Yes", and "No". The selection image 600 may be displayed on the display device 210 together with an all-around view image, a front view image, or a rear view image. The selection image 600 may be an image superimposed on any of an all-around view image, a front view image, and a rear view image.

Next, the determination unit 152 determines whether the second vehicle control has been selected (Step S410). As an example, the determination unit 152 performs this determination based on the type of signal output from the display device 210. When the driver has selected to perform the second vehicle control and a signal to perform the second vehicle control has been output from the display device 210 to the determination unit 152, the determination unit 152 determines that the second vehicle control has been selected ("Yes" at Step S410). Subsequently, the flow proceeds to processing of Step S360. The processing from Step S360 to Step S370 is the same as the processing illustrated in FIG. 3 of the parking assist device 150 according to the first embodiment, and hence descriptions thereof are omitted. Subsequently, the output unit 221 outputs, to the display device 210, the image representing the corrected path (Step S420). Based on the output from the output unit 221, the display device 210 displays or projects a corrected path extending from the second position to the first position. Subsequently, the flow proceeds to processing of Step S380. The processing of Step S380 is the same as the processing illustrated in FIG. 3 of the parking assist device 150 according to the first embodiment, and hence descriptions thereof are omitted.

On the other hand, when the driver has selected not to perform the second vehicle control and a signal representing that the second vehicle control is not executed (or is suspended) is output to the determination unit 152, the determination unit 152 determines that the second vehicle control has not been selected ("No" at Step S410). Subsequently, the flow proceeds to processing of Step S390. The processing of Step S390 is the same as the processing illustrated in FIG. 3 of the parking assist device 150 according to the first embodiment, and hence descriptions thereof are omitted.

Functions and Advantages

The output unit 221 displays an image representing a corrected path for moving from the second position to the first position, on the display device 210 included in the vehicle 200. Thus, the driver can recognize the corrected path of the movement of the vehicle 200. Thus, the driver can grasp the behavior of the vehicle 200, and reduce the uncomfortable feeling caused by unexpected behavior of the vehicle 200. The driver can check whether an obstacle is present in the corrected path of the movement of the vehicle 200.

The output unit 221 causes the display device 210 in the vehicle 200 to display an image for allowing the driver to select whether to perform the second vehicle control. Thus, the driver can select whether to perform the second vehicle control depending on situations. For example, the driver can select not to perform the second vehicle control when he/she wants to save the time of the second vehicle control in a situation where he/she is in a hurry for exiting the vehicle.

Other Embodiments

While the configuration of the present disclosure has been described above based on the first and second embodiments, the present disclosure is not limited to the above-mentioned embodiment. For example, partial configurations of the parking assist devices 150 and 230 according to the first and second embodiments may be combined as appropriate. In addition, the configurations of the parking assist devices 150 and 230 can be changed as appropriate within the range not departing from the gist of the technical concept of the present disclosure. For example, the parking assist device 150 is applicable to a valet parking system. The valet parking system includes a server. The server holds parking paths for moving from predetermined positions in a parking lot to a first position. By acquiring a parking path from the server, the parking assist device 150 can perform first vehicle control.

The output unit 221 in the present disclosure may communicate with an external terminal, and output, to a display device of the external terminal, the selection image 600 for allowing a driver to select whether to perform the second vehicle control. The output unit 221 may communicate with the external terminal, and output an image representing a generated corrected path on a display device included in the external terminal. The external terminal is, for example, a mobile terminal. As an example, this configuration can be used when executing parking assist in which a user operates a vehicle through an external terminal outside the vehicle, such as remote parking. Therefore, even when the user is outside the vehicle, the user can recognize the corrected path. The driver can grasp the behavior of the vehicles 100 and 200, and reduce the uncomfortable feeling caused by unexpected behavior of the vehicles 100 and 200. The user can check whether an obstacle is present in the corrected path. Even when the user is outside the vehicle, the user can select whether to perform the second vehicle control depending on situations. As an example, the user can select not to perform the second vehicle control when he/she wants to save the time of the second vehicle control in a situation where he/she is in a hurry for exiting the vehicle.

In the second embodiment, the output unit 221 generates the selection image 600 or an image representing a corrected path, and outputs the image to the display device 210, but the embodiment is not limited thereto. For example, the output unit 221 may output, to the display device 210, a generation signal for causing the display device 210 to display the selection image 600 or an image representing a corrected path. Then, the display device 210 may generate the selection image 600 or the image representing the corrected path in response to the generation signal from the output unit 221.

The vehicles 100 and 200 may include a notification device, and the driver may be notified that second vehicle control is to be performed based on the output of the parking assist devices 150 and 230. As an example, the notification device is a speaker. In this case, a signal representing that the second vehicle control is to be performed is output from the parking assist devices 150 and 230 to the notification device. The notification device may output voice guidance such as "Parking position deviates from a contactless power feeding device. Parking position will be adjusted."

The path generation unit 151 in the present disclosure may acquire information representing a parking region from the acquisition device 110, and generate a parking path for moving to the parking region P by using the information representing the parking region and current position information at the time of starting parking assist of the vehicle 100 or 200. In this case, when the vehicle 100 or 200 has moved to the parking region P and the vehicle 100 or 200 can communicate with the contactless power feeding device 400, the path generation unit 151 receives position coordinates of the contactless power feeding device 400 from the contactless power feeding device 400. Based on the received position coordinates, the path generation unit 151 generates a parking path for moving to the first position.

In the parking assist devices 150 and 230 described in the above-mentioned embodiments, the blocks of the path generation unit 151, the determination unit 152, the parking position correction unit 153, the vehicle control unit 154, and the output unit 221 may be individually formed as a single chip by a semiconductor device such as LSI, or may be formed as a single chip so as to include part or whole thereof.

Part or whole of processing of each functional block in each of the above-mentioned embodiment may be implemented by a computer program. Each piece of processing in the above-mentioned embodiment may be implemented by hardware, or may be implemented by software (including a case where processing is implemented together with operating system (OS), middleware, or predetermined library). Furthermore, each piece of processing in the above-mentioned embodiment may be implemented by mixed processing of software and hardware.

The execution order in the processing method according to the above-mentioned embodiment is not necessarily limited to the descriptions in the above-mentioned embodiment, and the execution order can be switched within the range not departing from the gist of the present disclosure.

The processing method executed by the above-mentioned parking assist devices 150 and 230 is included in the scope of the present disclosure. Examples of the computer-readable recording medium include a flexible disk, a hard disk, a CD-ROM, an MO, a DVD, a DVD-ROM, a DVD-RAM, a Blu-ray (BD (registered trademark)) disc, and a semiconductor memory. The computer program is not limited to the one recorded in the above-mentioned recording medium, and may be transmitted over networks represented by an electric communication line, a wireless or wired communication line, and the Internet.

Figure 8:
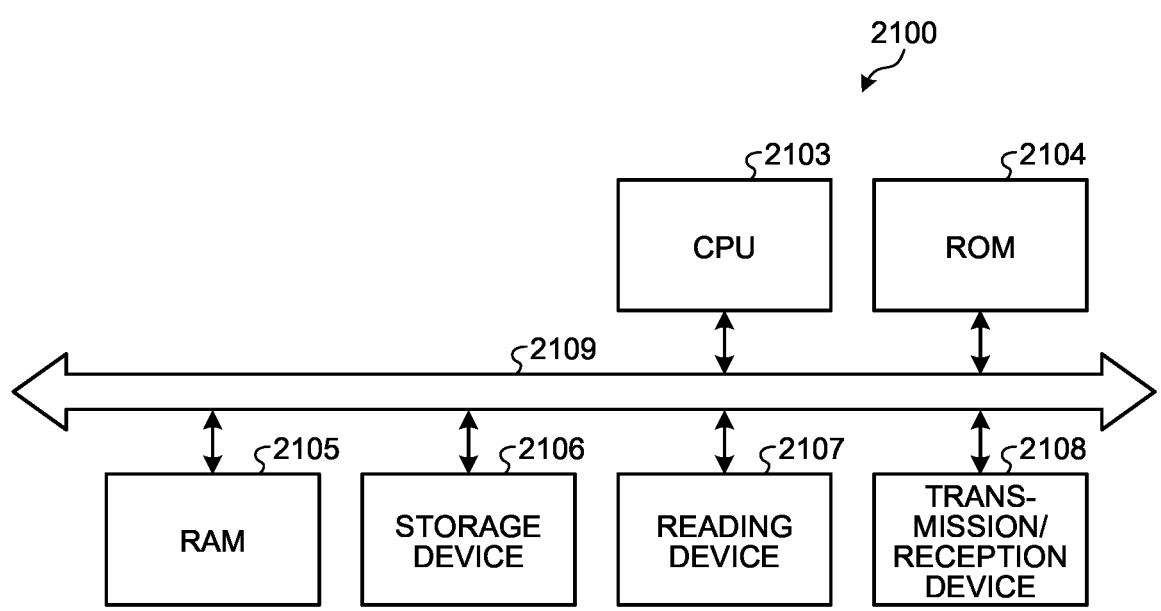
FIG. 8 is a diagram illustrating an example of a hardware configuration of a computer included in the parking assist device according to the embodiments of the present disclosure.

FIG. 8 is a diagram illustrating an example of a hardware configuration of a computer. The functions of the units in each of the above-mentioned embodiments are implemented by computer programs executed by a computer 2100.

As illustrated in FIG. 8, the computer 2100 includes a CPU 2103, a ROM 2104, and a RAM 2105. The computer 2100 includes a storage device 2106 such as a hard disk device and a solid state drive (SSD), a reading device 2107 for reading information from a recording medium such as a digital versatile disc read only memory (DVD-ROM) and a universal serial bus (USB) memory, and a transmission/reception device 2108 for communicating through a network. The above-mentioned units are connected by a bus 2109. The reading device 2107 reads a computer program for implementing the functions of the above-mentioned units from a recording medium having the computer program recorded thereon, and stores the computer program in the storage device 2106. Alternatively, the transmission/reception device 2108 communicates with a server device connected to a network, and stores a computer program for implementing the functions of the above-mentioned units downloaded from the server device into the storage device 2106.

The CPU 2103 copies the computer program stored in the storage device 2106 to the RAM 2105, and sequentially reads and executes instructions included in the computer program from the RAM 2105. In this manner, the functions of the above-mentioned units are implemented. When executing the computer program, information obtained by various kinds of processing described in each embodiment is stored in the RAM 2105 or the storage device 2106 and is used as appropriate.

The parking assist device, the vehicle, and the parking assist method according to the present disclosure can provide more improved parking assist when automatically parking a vehicle to a parking region provided with a contactless power feeding device.

What is claimed is:

1. A parking assist device comprising:
a hardware processor configured to
acquire region information on a parking region in which a contactless power feeding device is provided,
perform, based on the region information, a first vehicle control for moving a vehicle to one position of the parking region, and
perform, after the vehicle is stopped in the one position of the parking region by the first vehicle control, a second vehicle control to move the vehicle to another position from the one position when relative positions between a power reception device provided in the vehicle and the contactless power feeding device deviate from each other,
wherein the power reception device of the vehicle does not face the contactless power feeding device in the one position,
the power reception device of the vehicle faces the contactless power feeding device in the other position,
the one position is a position at which the vehicle is stopped in the parking region after the first vehicle control is completed, and
the second vehicle control is performed after the vehicle is stopped at the one position of the parking region after the first vehicle control is completed.

2. The parking assist device according to claim 1, wherein the other position is a position at which charging efficiency of contactless charging becomes maximum.

3. The parking assist device according to claim 1, wherein the other position is a position at which charging efficiency of contactless charging becomes equal to or larger than a reference value.

4. The parking assist device according to claim 1, wherein the hardware processor is configured to generate, based on the region information on the parking region, a path for moving the vehicle to the parking region.

5. The parking assist device according to claim 1, wherein the hardware processor is configured to generate a path extending from the one position to the other position.

6. The parking assist device according to claim 5, wherein the hardware processor is configured to cause a display device of the vehicle to display the path extending from the one position to the other position.

7. The parking assist device according to claim 6, wherein the hardware processor is configured to cause the display device to display an image for selecting whether to perform the second vehicle control.

8. The parking assist device according to claim 1, wherein the hardware processor is configured to
determine a distance between the one position and the other position, and
performs the second vehicle control when the distance is larger than a predetermined value.

9. The parking assist device according to claim 8, wherein the hardware processor is configured to
receive, from the power reception device, information on charging efficiency obtained in a case where contactless charging is started between the power reception device and the contactless power feeding device, and
perform the second vehicle control when the information represents that the charging efficiency is smaller than a reference value.

10. The parking assist device according to claim 9, wherein the hardware processor is configured to suspend the second vehicle control when the distance between the one position and the other position is equal to or larger than the predetermined value or when the charging efficiency is equal to or larger than the reference value.

11. The parking assist device according to claim 9, wherein the hardware processor is configured to output, to the power reception device, a signal for starting contactless charging when the distance between the one position and the other position is equal to or smaller than the predetermined value or when the charging efficiency is equal to or larger than the reference value.

12. The parking assist device according to claim 1, wherein the parking assist device further comprising a determination unit, the determination unit being configured to receive, from the power reception device, information on charging efficiency in a case of starting contactless charging at the one position, and determine whether to perform the second vehicle control based on the information on charging efficiency.

13. A vehicle comprising:
an acquisition device configured to acquire region information on a parking region in which a contactless power feeding device is provided;
a power reception device configured to receive power from the contactless power feeding device; and
a parking assist device including a hardware processor configured to
perform, based on the region information, a first vehicle control for moving the vehicle to one position of the parking region, and
perform, after the vehicle is stopped in the one position of the parking region by the first vehicle control, a second vehicle control to move the vehicle to another position from the one position when relative positions between the power reception device and the contactless power feeding device deviate from each other,
wherein the power reception device of the vehicle does not face the contactless power feeding device in the one position,
the power reception device of the vehicle faces the contactless power feeding device in the other position,
the one position is a position at which the vehicle is stopped in the parking region after the first vehicle control is completed, and
the second vehicle control is performed after the vehicle is stopped at the one position of the parking region after the first vehicle control is completed.

14. The vehicle according to claim 13, further comprising a display device configured to display a path extending from the one position to the other position.

15. The vehicle according to claim 13, further comprising a display device configured to display an image for selecting whether to perform the second vehicle control.

16. A parking assist method implemented by a computer provided in a vehicle, the method comprising:
acquiring region information on a parking region in which a contactless power feeding device is provided;
performing, based on the region information, a first vehicle control for moving the vehicle to one position of the parking region; and
performing, after the vehicle is stopped in the one position of the parking region by the first vehicle control, a second vehicle control for moving the vehicle to another position from the one position when relative positions between a power reception device included in the vehicle and the contactless power feeding device deviate from each other,
wherein the power reception device of the vehicle does not face the contactless power feeding device in the one position,
the power reception device of the vehicle faces the contactless power feeding device in the other position,
the one position is a position at which the vehicle is stopped in the parking region after the first vehicle control is completed, and
the second vehicle control is performed after the vehicle is stopped at the one position of the parking region after the first vehicle control is completed.

* * * * *